(12) United States Patent (10) Patent No.: US 7,740,359 B2
Schnuckle et al. (45) Date of Patent: Jun. 22, 2010

(54) VIDEO DISPLAY SYSTEM WITH AN OSCILLATING PROJECTOR SCREEN

(75) Inventors: Gary W. Schnuckle, Altadena, CA (US); Lanny S. Smoot, Thousand Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 483 days.

(21) Appl. No.: 11/837,990

(22) Filed: Aug. 13, 2007

(65) Prior Publication Data

US 2009/0046258 A1    Feb. 19, 2009

(51) Int. Cl.
    *G03B 21/14* (2006.01)
(52) U.S. Cl. ............... 353/79; 353/7; 353/9; 353/10; 353/121; 353/122; 359/446; 359/475; 359/476; 359/477; 359/462; 472/60; 472/119
(58) Field of Classification Search ............ 353/7, 353/9, 10, 15, 46, 79, 94, 97, 121, 28, 30, 353/69, 101, 122; 359/475, 476, 477, 462; 348/51, 42; 472/60, 119
    See application file for complete search history.

(56) References Cited

U.S. PATENT DOCUMENTS 5,678,910 A    10/1997    Martin
6,302,542 B1   10/2001    Tsao
6,554,430 B2    4/2003    Dorval et al.
6,665,048 B2   12/2003    Gelbart

OTHER PUBLICATIONS

"Propeller Clock" Mechanically Scanned LED clock; http://www.bobblick.com/techref/projects/propclock/propclock.html; Copyright 1995-2002 Bob Blick; retrieved Oct. 19, 2006.

*Primary Examiner*—William C Dowling
*Assistant Examiner*—Sultan Chowdhury
(74) *Attorney, Agent, or Firm*—Marsh Fischmann & Breyfogle LLP; Kent A. Lembke

(57) ABSTRACT

An apparatus for displaying images from a video projector. The apparatus includes a virtual projector screen assembly with an elongate screen element, such as a rod, that is mounted at one end to a base. The base is adapted for pivoting about its axis, arid a driver mechanism pivots the base at high frequencies. During operation, the screen element oscillates between two edge positions with images projected from the projector being displayed on a side of the screen element facing or proximate to the projector. The two edge positions can be thought of as intersecting at the base and define a sweep angle (e.g., the angular difference between the two outer travel points of the screen element that is typically less than about 90 degrees). The driver may include a motor with an oscillating output shaft that pivots the base such as with a belt attached to the base.

29 Claims, 13 Drawing Sheets

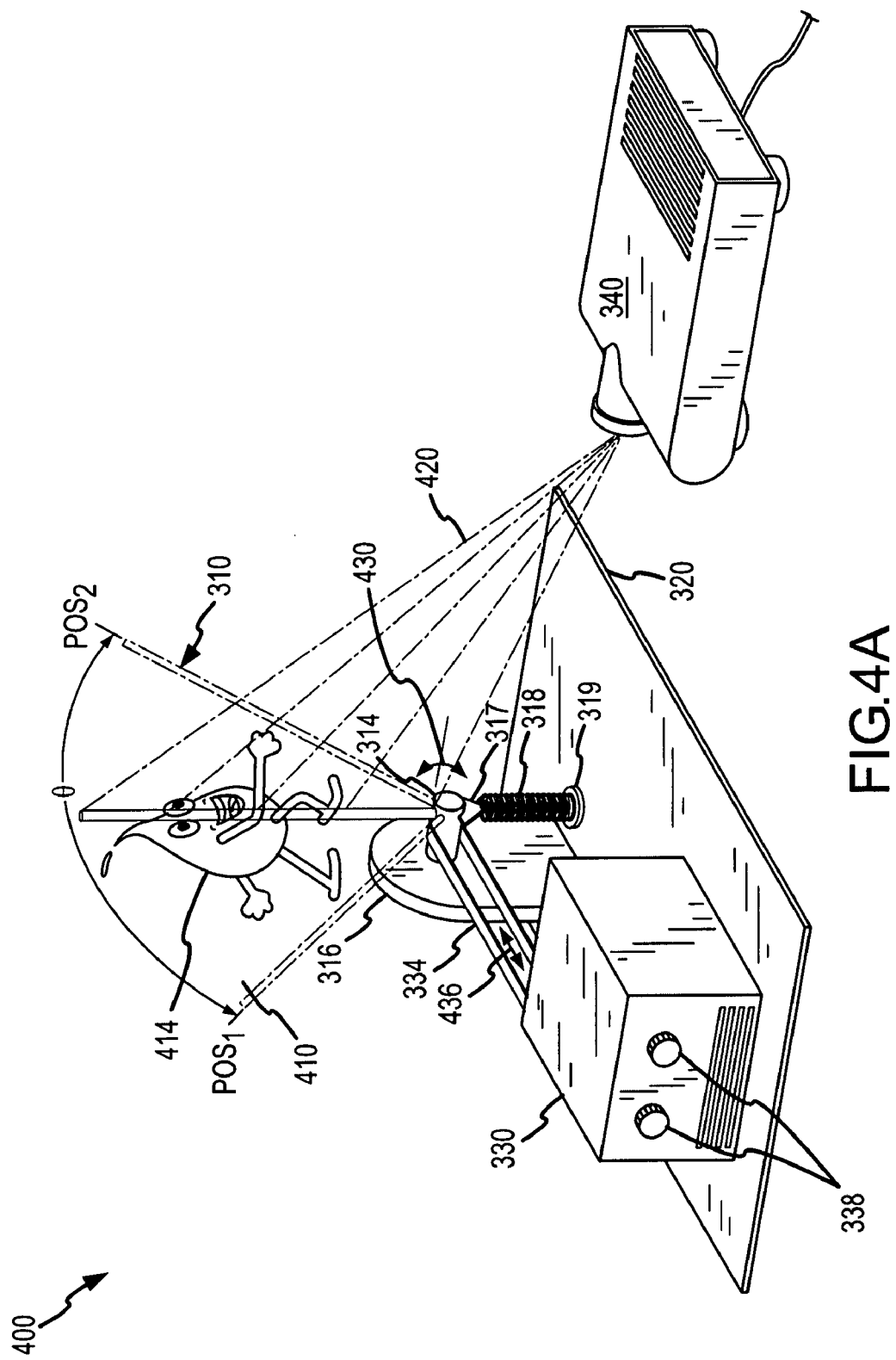

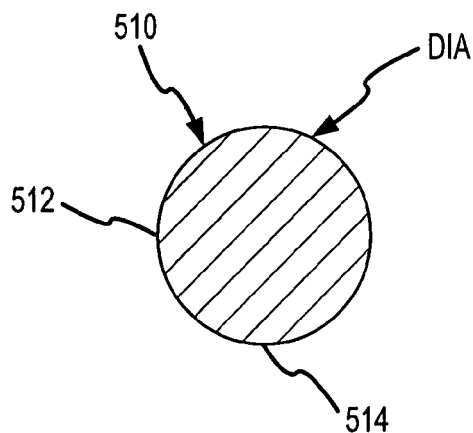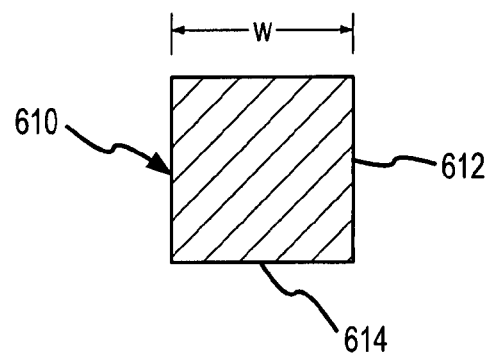
FIG.6A  FIG.6B
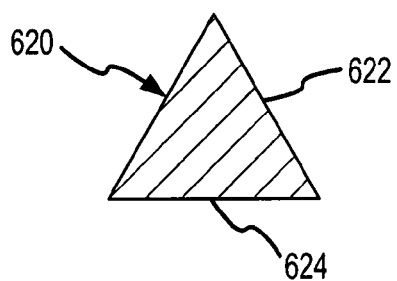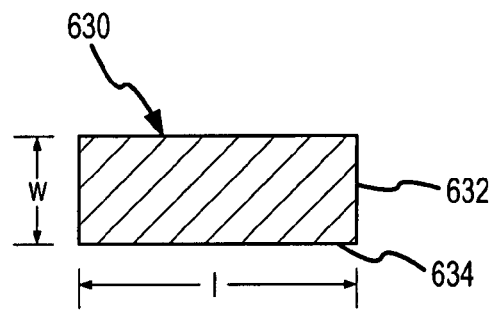
FIG.6C  FIG.6D

VIDEO DISPLAY SYSTEM WITH AN OSCILLATING PROJECTOR SCREEN

BACKGROUND OF THE INVENTION

1. Field of the Invention

The present invention relates, in general, to holography (e.g., visual illusion and persistence of vision) imagery including floating two or three dimensional projections or displays and, more particularly, to, a system for producing holographic effects or producing illusory or virtual projection surface effects using a partial screen surface that oscillates at high speeds.

2. Relevant Background

In the visual effects and visual media fields, there are continuing demands for methods for projecting, or generating floating objects or objects that appear to be projected with no screen. Even more preferred is to project an object that appears to be hovering in space and that is three dimensional (3D objects). Holography or the production of holograms is one technique for addressing this demand and has been studied for many years. Holograms are images that are recorded and reconstructed or projected that are three dimensional (3D). While many improvements have been made, holograms are still relatively difficult to produce; and may require multiple projection components such as beamsplitters, mirrors, and laser sources to effectively reconstruct a recorded hologram. Such a system may be costly and require a significant amount of space.

Additionally, many holograms are monochromatic such as common white light holograms, and this is generally not acceptable to today's media consumers who demand more vivid and colorful images. Further, there are many applications where it is desirable for the projected image to appear to be speaking or making other sounds such as when the projected object is an animated character or person. Conventional holographic technology has not been able to meet all of these practical requirements and has not been widely adopted for generating visual effects in amusement or theme parks, in movie theatres, or elsewhere.

Some efforts have been made to produce 3D objects by using a moving screen, but these generally do hot produce desired holographic effects or have other limitations such as operational complexity, space requirements, and cost. For example, U.S. Pat. No. 5,678,910 describes a device for producing 3D imagery in which one Or more projectors project images onto a planar screen that is rotated rapidly about an axis. It is intended that the screen would be spun quickly enough that a viewer would riot detect the motion but instead would see a, 3D or "solid" object. While providing some beneficial results, the spinning screen technique may not be effective to hide the screen and also creates undesirable side effects such as noise and air movement similar to those produced by a fan, which limits the use of such a device in applications in which the viewers may be near the spinning screen. Other techniques using rotating projection screens have been developed, but these also fail to meet all the demands of the visual effects and visual arts fields, e.g., U.S. Pat. Nos. 6,554,430 and 6,665,048. Some attempts to produce floating visual displays have provided light sources such as light emitting diodes (LEDs) on fan blades or projected light onto such rotating fan blades. These effects have some desirable qualities, but, again, such rotating "screens" have not been widely adopted to produce 3D or other holographic effects.

There remains a heed for systems and devices for producing visual displays or projections of 3D images and preferably such systems and devices would use no projector screen or at least provide the illusion that no screen was used. Further, it is preferable that the produced images be matched with sound or audio output and, when desired, be provided, in color (e.g., not limited to monochrome).

SUMMARY OF THE INVENTION

The present invention addresses the above problems by providing video projection systems that provide a "virtual" or hidden projector screen that produces the illusion that images are displayed without a screen. To provide the virtual projector screen, embodiments of the invention use a rapidly oscillating screen element such as a rod that is pivotally mounted at one end to a base so that the rod can pivot about this end. As a result, the screen element oscillates between two edge positions or can be thought of as moving through a sweep angle to provide a pie wedge or V-shaped screen with a face or side of the screen element tracing out a locus of positions that define the virtual projector screen. One or more projectors are provided to direct projected images onto the oscillating screen element to provide a flickering displayed image with hologram-like results as the quickly moving screen element is nearly invisible to viewers of the displayed image but the image quality is relatively high particularly at higher oscillating rates or frequencies. In some applications, the displayed image appears to be displayed outward in a V-shape from the base of the vibrating or oscillating screen element or rod.

More particularly, an apparatus is provided for displaying images that includes a projector. The apparatus includes a virtual projector screen assembly with ah elongate screen element that is mounted at one end to a base. The base is adapted for pivoting about its axis, and the apparatus further includes a driver mechanism that functions to pivot the base. During operation, the screen element oscillates between two edge positions with images projected from the projector being displayed on a side of the screen element facing or proximate to the projector. The two edge positions can be thought of as intersecting at the base and define a sweep angle (e.g., the angular difference between the two outer travel points of the screen element that is typically less than about 90 degrees). The driver may include a motor with an oscillating output member or shaft that pivots the base through a direct connection or an indirect link such as a belt, a chain, or the like. The motor may operate in response to an input control signal (e.g., such as from a sine wave generator), and the input control signal is used in some cases to adjust movement of the motor's output shaft, which, in turn, adjusts the oscillation of the screen element. The motor control signal, such as its amplitude, can also be used to select the location of the two edge positions (i.e., the sweep angle) for the screen element. In some particular embodiments, the screen element is a rod with a circular cross section having a diameter of less than about 1 inch (e.g., 0.125 to 0.5 inches) and a length less than about 6 feet (e.g., 2 to 4 feet in length in some cases). The apparatus may include an additional or second projector that is positioned to project additional images onto a side of the screen element opposite the first display side, and the additional images may be the same as the first displayed images or may be different (e.g., an unrelated video stream or a related stream such as another view of the same images provided with the first projector).

BRIEF DESCRIPTION OF THE DRAWINGS

FIG. 4A illustrates the projection system of FIG. 3 during operation in which a projector projects a video image on a rapidly oscillating rod or screen element;

FIGS. 6A-6D illustrate cross sections of exemplary screen elements, rods, or sticks useful in visual projector screens Of the invention;

DETAILED DESCRIPTION OF THE PREFERRED EMBODIMENTS

Figure 1:
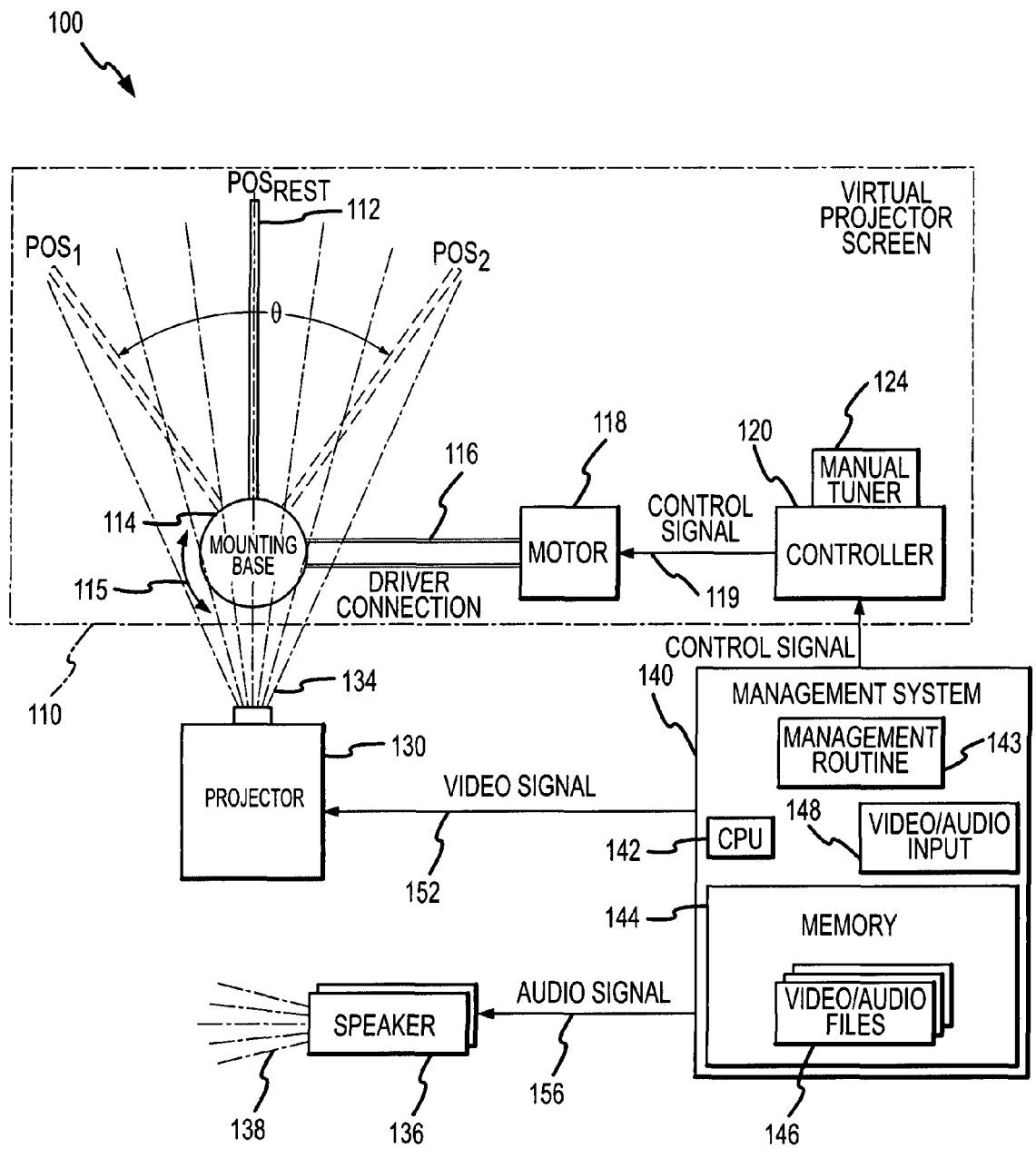
FIG. 1 is a functional block diagram of a video projection system that includes a virtual projector screen of the invention, e.g., an oscillating projector screen that provides the illusion that no screen is being used or that the image is being projected from the base of the oscillating screen.

Briefly, the present invention is directed to a system or device for providing a virtual projection or projector screen that provides a desired visual effect. The projector screen is "virtual" because it is hot a standard large, planar sheet or object but is instead a screen that is invisible or difficult for the human eye or a viewer to detect. Such hidden or virtual screens are useful and desirable in many special effect applications such as video displays in theme parks, in marketing displays, and the like. Briefly, a video projection system of the invention includes a virtual projector screen upon which a projector projects a video image. The virtual projector screen is provided, in one embodiment, through the use of a long, slender screen element or member that is oscillated rapidly back and forth between two edge positions by a driver, such as a motor operable to quickly change directions. The screen element may be thought of as a "whip screen" as it oscillates about its mounting point or base, which is turned by the driver about its axis, such that the screen element provides an angular sweep between the two edge points. The speed or angular velocity at which the screen element or whip moves is selected such that the projected video is visible or displayed at the positions of the screen element at and between the two edge positions while the screen element itself is hard to detect. For example, the screen element may be a rod that is whipped or oscillated rapidly between the two edge positions that may be up to 90 degrees or more apart with sweeps ranging from about 30 to about 60 degrees being useful in many cases. The virtual screen then appears to be a "V-shape" with its width defined by the angular sweep of the screen element or whipping rod.

In practice, the virtual projector screen supports a video image over the entire angular sweep of the screen element or over even a larger area, but the video is only intermittently displayed on a portion of the screen element facing the projector (e.g., displayed one to several times at each location (or a subset of the element's locations) each second). Such intermittent display by the oscillating screen causes the video to be displayed with a desired flicker that lends itself to the desired holographic-like effect with the amount of flicker varying with the rate at which the screen element is oscillated or its angular velocity, with more flicker being detected at slower speeds or oscillation rates. Additionally, because the screen element is moving at speeds that make it difficult to see, the video displayed oh the moving screen element appears to be projected upward at an angle from the base of the screen element. This furthers the illusion that the video is not being projected from the side onto a screen. The projected image appears to be floating and to have three dimensions due to the use of the oscillating screen element. This 3D effect can be furthered in some projection systems by including a second video projector that is focused upon the back side of the screen element and that projects a video that is synchronized with the video provided by the first projector but that displays a different or back side of the displayed images. For example, the second projector may project a video that shows the back of an animated character or person shown from the front with the first projector on the front or first side of the screen element. As a result, the displayed video takes on a multi-dimensional appearance.

An exemplary video projection system 100 is shown in FIG. 1 in which a virtual projector screen 110 is provided for use in achieving a hologram-like effect, 3D image, or other visual effect with a hidden or virtual screen. The illustrated virtual projector screen 110 includes a screen element 112 that is mounted, e.g., rigidly mounted, at one end or its base end to a mounting base 114. The screen element 112 is generally a relatively thin, elongate member such as a rod, beam, stick, or the like that is made of a rigid material such as a plastic, a metal, a fiber (such as a carbon fiber, a graphite fiber, or the like), or other material that is suited for rapid and numerous oscillations about the base end. For example, the screen element 112 may be a rod with a circular cross section having a diameter of about 0.125 inches to 2 or more inches and a length of up to about 10 feet or more with lengths of less than about 6 feet and more preferably less than about 4 feet being well-suited for rapid oscillations with conventional drivers or oscillating equipment (e.g., longer and larger/heavier screen elements 112 may require larger mounting bases 114, driver connections 116, and more powerful motors 118 or other oscillating devices). In one specific, but not limiting example, the screen element is a 0.25-inch circular rod formed of carbon fiber and having a length extending from the base 114 of less than about 3 feet.

As shown, the mounting base 114 is provided or mounted in the projector screen 110 such that it can be pivoted about its axis as shown at 115 by a linked or contacting driver connection 116. During typical operations of the system 100, the pivoting 115 of base 114 causes the attached screen element 112 to move from its rest position, $Pos_{Rest}$, and then back and forth between a first edge position, $Pos_1$, and a second edge position, $Pos_2$. Such movement may be considered oscillating of the screen element between the two edge positions, $Pos_1$ and $Pos_2$, and/or sweeping the element 112 over the, angular sweep or range, $\theta$. The amount of sweep, $\theta$, defines the width or size of the "V" and area provided by the screen element 1.12 for displaying projected images 134. The size may vary significantly to practice the invention and may vary with the length and/or thickness of the element 112 to control excessive whipping of its tip. In representative embodiments, the sweep angle, $\theta$, is selected to be less than about 90 degrees with sweeps, $\theta$, in the range of 30 to 60 degrees being particularly useful. The sweep angle, $\theta$, may be over 90 degrees, but it is desirable to have the screen element sweep through the entire area between its two edge positions, $Pos_1$ and $Pos_2$, frequently to avoid excessive flicker and/or to avoid revealing the element 112 (i.e., with slower oscillations, element 112 is more readily detectable to a viewer).

To pivot or quickly rotate the mounting base 114 as shown at 115, a motor 118 is linked to the base 114 with a driver connection 116. For example, the motor 118 may be a conventional electric motor such as a DC motor or servo disc DC motor, and the connection 116 may be the output shaft of the motor 118 that alternates its spin direction based on a control signal 119 from a motor controller 120. Alternatively, the connection 116 may be a belt, chain, or other connector that is attached or contacts an output shaft or oscillating element of the motor 118 and the mounting base 114.

In these embodiments, the motor 118 operates in response to control signals 119 from controller 120, which are any signal waveform or pulse useful for driving the motor 118 to cause the mounting base 114 to oscillate between its to edge positions, $Pos_1$ and $Pos_2$. For example, the control signals 119 may control the direction of the motor 118 by applying signals of differing or reversing polarity onto the motor's leads. The speed of the rotation/pivoting 115 about the axis of the base 114 controls the angular velocity or oscillating, rate of the screen element 112. For example, in one embodiment, this is generally controlled by selecting the frequency of the applied pulses in control signals 119. The controller 120 may take many forms to practice the invention. In one embodiment, the controller 120 is a motor controller comprising a sine generator with the direction of the motor 118 and the driver connection 116 varying with the sign of the generated sine wave. In this embodiment, the frequency of the generated sine wave/control signal 119 is useful for setting the oscillating rate of the screen element 112 as well as the corresponding angular velocity or speed of the element 112. The magnitude of a generated control signal 119 (e.g., sine wave or the like) is used or selected in turn to adjust or define the sweep angle, $\theta$, or amount of rotation 115 of the base 114 and attached screen element 112. These control settings may be automated and/or stored in memory in some cases. In other cases, as shown, a manual tuner or adjustment 124 may be provided on the controller 120 to allow an operator to set or define both the sweep angle, $\theta$, for the screen element 112, the oscillating rate or frequency, and/or the element's angular velocity (i.e., speed at which the element 112 moves between the two edge positions, $Pos_1$ and $Pos_2$). In most cases, oscillating frequencies in the rage of 3 to 10 Hertz provide pleasing combinations of image solidity and "hologram-like" flicker.

The system 100 further includes a projector 130 that operates to project or generate projected images 134, and the projector 130 is focused or directed such that the projected images 134 are directed on the oscillating screen element 112. In general, the projector 130 is a video projector that receives an analog or, more commonly, a digital input video signal 152 (or plays video disks or video files from its internal memory) but a film projector may be used in some cases to practice the invention. For example, the projector 130 may be a digital (and optionally high definition) video projector available from distributors including Dell, Inc., Marantz (D&M Holding, Inc.), or other electronics/computer companies with the particular projector utilized not being a limiting feature of the invention. In many applications, it is preferable to use projectors that project a video frame and leave it in place for a complete frame time such as an LCD or DILA projector to avoid artifacts caused by visual beating between the whip's or element's 130 movement and video refresh. Alternatively, it may be desirable to use a (simultaneous color) 3 chip DLP type projector as opposed to a color-wheel (sequential color) DLP type projector (although such use may be desirable to achieve an artistic effect).

The projector 130 is preferably positioned and/or focused such that the cross sectional area of the projected images 134 at the location of the screen element 112 is about the size of the area defined by the sweep of the element 112. In other words, it is preferable that the projected images 134 have a large enough cross section in their beam such that they strike the side or face of the element 112 facing or proximate to the projector 130 as the element 112 moves between edge positions $Pos_1$ to $Pos_2$ but a somewhat larger or smaller beam for the images 134 may be used in some cases. The projector 130 may be positioned relative to the mounting base 114 and element 112 such that the center of the beam of the images 134 is substantially perpendicular to the plane containing the element 112 and its edge positions, $Pos_1$ and $Pos_2$ or the projector may be above or below the element and/or base 112, 114 such that the images 134 are projected at a downward or upward angle onto the element 112. In some cases, the projector 130 is positioned below the element 112 when it is in its display position (e.g., the base 114 and element 112 may be raised up or lowered down into its display position) so as to better hide the projector.

The system 100 further is shown to include speakers 136 that generate an audio output 138 based on audio signals 156. The speakers 136 may be separate as shown or provided as part of the projector 130. The audio signals 156 are preferably synchronized and/or mated to the video signals 152 such that the projected images 134 and audio output 138 are matched or timed to correspond (e.g., a character shown speaking in the image 134 would also be heard to be speaking via output 138 from speakers 136).

The system 100 may include a management system 140 to provide the video signals 152 and audio signals 156 as well as to provide control signals to the motor controller 120 (or to simply power on the controller 120 and motor 118). The management system 140 may take a number of forms to practice the invention such as a standard computing device with a processor 142 and a memory 144. The memory 144 may be used to store video and audio files 146 or the signals 152, 156 may be generated based on input signals received by the management system 140 via input(s) 148. The processor 142 may be used to run a management routine 143 that may determine which of the files 146 (or input signals via input 148) to provide to the projector 130 and speaker 136 and/or when to operate the virtual projector screen 110 and when such files are transmitted for projection. Further, the management routine 143 may operate the controller 120 via control signals to adjust/modify the operation of the motor 118 in some embodiments to not only identify when the screen 110 is operated but also other operating parameters such as oscillating rate, sweep angle, and the like (although these are often set via manual tuner 124 or the like and only periodically adjusted). Alternatively, the management routine 143 may operate responsively to input from an external device or controller (not shown) to determine when to operate screen 110, the projector 130, and the speaker 136 and which files 146 to output (e.g., in response to a triggering event such as when a theme attraction reaches a certain point, when a car, people mover, or a viewer is sensed to have reached a certain location or to be proximate, or other external factors). In other embodiments, the screen 110 is run on a more ongoing basis with the projector 130 being run to repeatedly or selectively project images 134 from a file (or from a DVD, tape, or other media).

Figure 2:
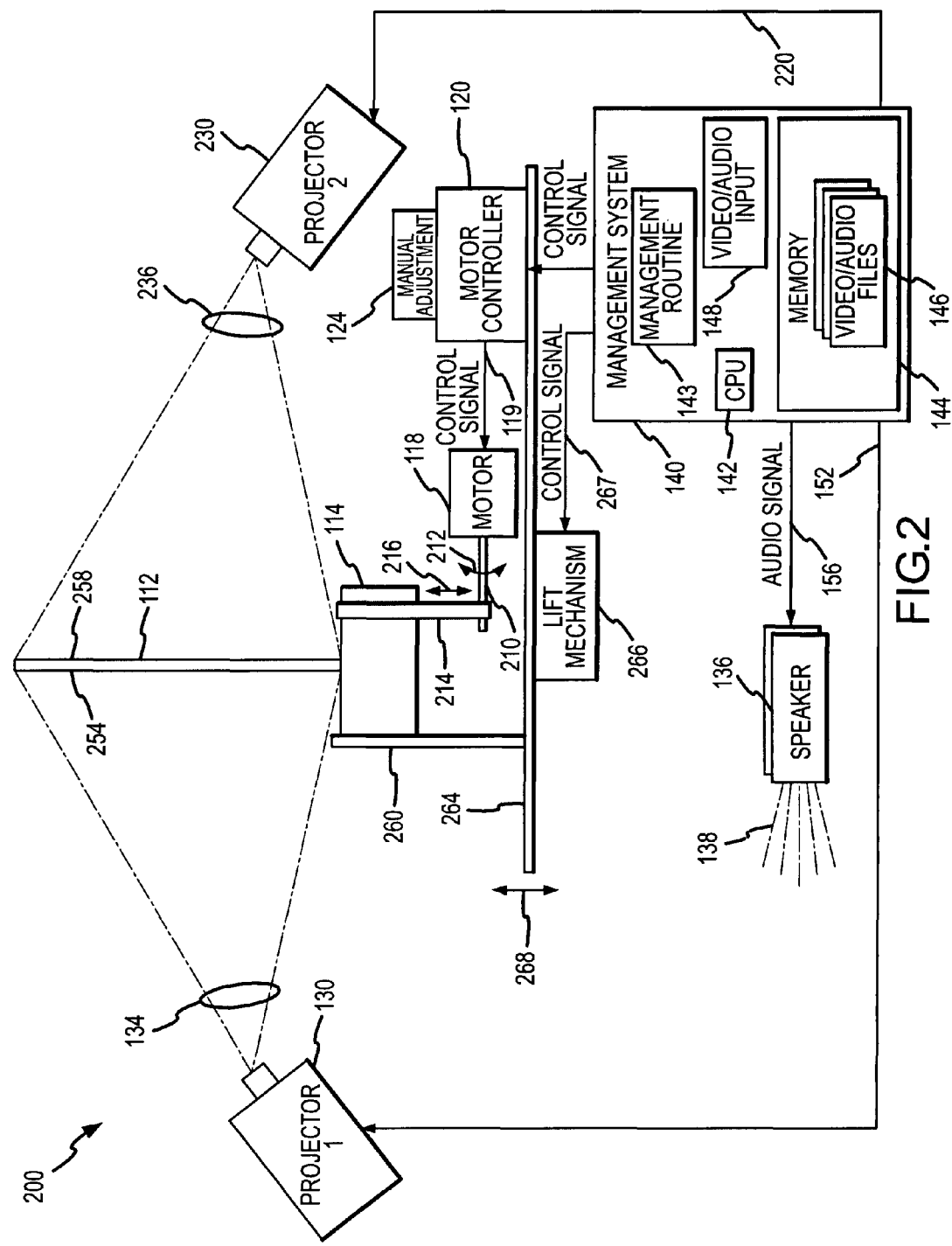
FIG. 2 is a functional block diagram of another video projection system similar to that of FIG. 1 but further showing a second projector used to project onto the back/second side of the oscillating rod or stick that forms the virtual projector screen.

FIG. 2 illustrates a functional block diagram of a video projection system 200 similar to FIG. 1 but of a "side" view of virtual projector screen assembly of the invention. Additionally, the system 200 is useful for showing the use of two (or more) projectors to achieve a desired illusion with the screen element 112. As with system 100, the system 200 includes a virtual projector screen that is provided by an elongate screen element 112 that is mounted on a pivotable base 114. A motor 118 is used to drive or pivot the base 114 to oscillate the screen element 112 based on control signals 119 from the motor controller 120, which is adjusted or tuned by manual adjustment 124 and powered or controlled by control signals from management system 140. Again, the management system 140 is shown to include a processor 142 that runs a management routine 143 that determines which and when video/audio files 146 from memory or from input 148 are used to control projectors/speakers and to run motor 118 via motor controller 120.

The system 200 of FIG. 2 differs from the system 100 in that two projectors are utilized to create an effect on screen element 112. As shown, a first projector 130 is operated to generate images 134 onto or toward a first side 254 of screen element 112 based on video signals 152. Audio signals 156 are synchronized with these signals 152 in some embodiments and are converted by speakers 136 to generate audio output 138. Further, a second projector 230 is provided in the system 200 that converts video signals 220 transmitted by the management system. 140 (or provided directly by a video, input line from another device not shown) into projected images 236. The projected images 236 are directed to a back or second side 258 of the screen element 112. In some embodiments, the projected images 134, 236 output by both projectors 130, 230 are synchronized and are the same images, e.g., both of the projected images 134, 236 are of the same video frames such as a person, an animated character, or the like. In other embodiments, the projected images 134, 236 are synchronized or timed to correlate but differ in content. A specific example of how differing images 134, 236 may be used is to achieve a two sided and/or projection with depth (e.g., 3D image). In this example, the first projector 130 may transmit images 134 onto side 254 of screen element 112 from a first file 146 that provide the front or "facing" side of an image while the second projector 230 transmits images 236 onto side 258 of the element 112 from a second file 146 that provide the back or rear facing side of the same image. In the example of a person or animated character, images 134 may be the front or face of the person/character while images 236 may be the back or rear portion of the person/character with their movements being synchronized. In this example, a viewer can walk around the circumference of the system virtual projector screen and see both sides of the projected image on the screen element, which tends to provide a more solid, 3D effect similar to that achieved with holograms.

The system 200 is also shown from a side view of the virtual projection screen with the screen element 112 moving in a plane substantially perpendicular to the page/paper. The motor 118 includes an output shaft or oscillating element 210 that is oscillated rapidly based on the control signals 119 from the motor controller 120 as shown with arrow 212. The shaft 210 may be connected directly to the base 114 to provide the motive force for oscillating the screen element 112. Alternatively, as shown in the embodiment of FIG. 2, the rotating or oscillating shaft 210 is in contact or linked with the base with member 214. The driving member 214 may be a rigid element in some cases or a more flexible member (e.g., a belt mat is placed in a groove or otherwise oh the outer surface of the motor shaft 210 and the pivotal base 114). Since the screen element 112 is rigidly attached to the base 114, the element 112 oscillates over a particular sweep or between two edge positions as the motor shaft 210 moves back and forth between two angular positions with the belt or other drive member 214 transferring the rotation 212 of the shaft 210 to the base 114 as shown with arrow 216.

In some embodiments, as discussed with reference to FIG. 1, it is desirable for the screen element 112 to be moved or repositioned hi total to cause a desired illusion. For example, the element 112 may be hidden when the system 200 is hot operating but be caused to rise up into a line of sight for an audience or viewers (e.g., people on a ride, passing a particular point in an attraction, and the like). To this end, the base 114 may be mounted (e.g., pivotally mounted) to a support or frame 260 such that it or at least the portion to which the screen element 112 is attached can freely pivot about an axis in response to movement by the drive member of belt 214. The frame 260 in turn is mounted onto a pedestal 264 that is configured to be moved or lifted by a lift mechanism 266 as shown with arrow 268. Such a lift 268 may occur when the system 200 is powered on or in response to a control signal from the management routine 143 of management system 140. The projectors 130, 230 may also be provided on pedestal 264 but more typically, the projectors 130, 230 are mounted on a separate framework or on separate structural elements. The projectors 130, 230 are also shown to be focused upward such that their image beams 134, 236 strike the screen element 112 when it is positioned in its raised or display position by the lift mechanism 266 (but this is not acquirement). For example, the tip of the element 112 may be positioned just below an opening in a cover, portion of a stage, or other structure hiding the system 200. To start a display, a control signal 267 may be sent to the lift mechanism 266 concurrently with a motor controller signal and, optionally, video signals 152, 220 and audio signal 156 (which may also be sent after the element is 112 moved to the display position). The lift mechanism 266 may move or raise 268 the base 114 up a distance (such as about the length of the screen element 112 or a smaller or larger distance) to place the screen element 112 in its display or raised position where it is exposed to the projected images 134, 236.

Figure 3:
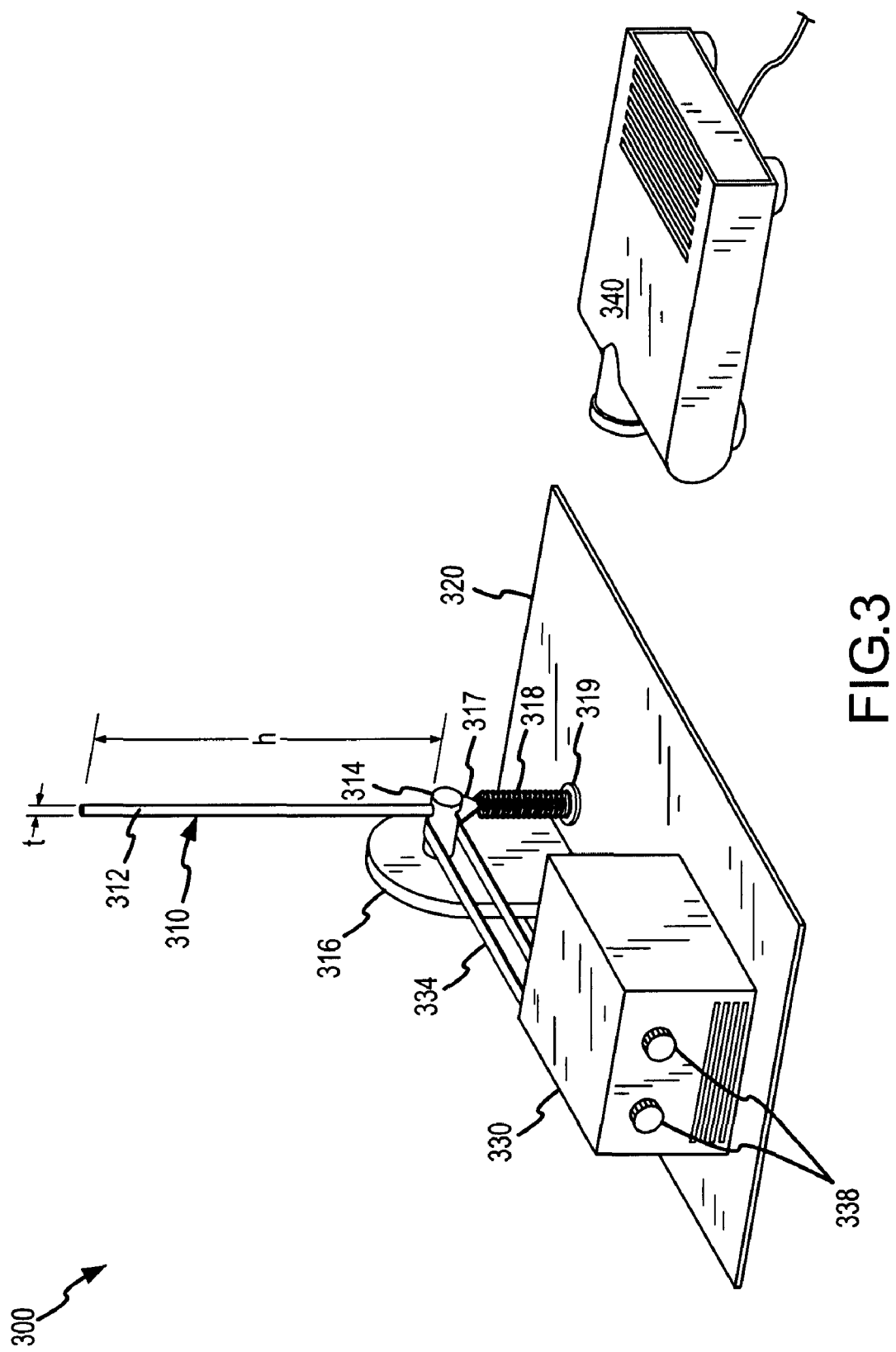
FIG. 3 is a plan view of a video projection system illustrating components useful for providing a virtual projector screen but prior to operation or at rest.

FIG. 3 illustrates a perspective view of one exemplary embodiment of a projection system 300, such as may be used in systems 100 and 200 of FIGS. 1 and 2. As shown, the system 300 includes a screen element 310 that is mounted to a pivotable base 314, which in turn is mounted to a stationary frame or support 316 provided on platform or pedestal 320. The screen element 310 includes a side or face 312 that is proximate to of facing a projector 340 to receive video images or motion pictures generated by the projector 340. The screen element 310 is shown at rest, i.e., the system 300 is riot operating. The element 310 is ah elongate, slender member such as a rod, a beam, a stick, or the like with a height or length, h, and a thickness, t, that is typically much smaller (e.g., the length may be anywhere from about 3 inches to 6 feet or more while the thickness or diameter for circular cross section rods is typically less than a few inches and more typically less than about 1 inch). The element 310 may be characterized similarly to a golf club or fishing rod with a level of stiffness or flexure, or it may simply be made, from a relatively rigid but elastic material that may be a hollow-walled member or a solid with specific thickness or diameter, t, such as carbon fiber, graphite, steel, or the like with a thickness or diameter of less than about 1 inch and more often less than about 0.5 inches (e.g., 0.25 to 0.375 inches).

The system 300 includes a motor 330 and includes a rotating or oscillating member (such as an output shaft) (not shown) that drives belt 334, which is attached to or in contact (e.g., by friction) with base 314. The motor 330 is shown to include manual adjustment knobs 338 to allow an operator to tune the operation of the motor 330. For example, the knobs 338 may allow adjustment of the amplitude and frequency of a sine wave of a motor controller of the motor 330 such that the oscillation fate and angular sweep (or predefined angle between two edge positions of the screen element 310) are defined for the screen element 310.

To control oscillations of the screen element 310 and simplify the reciprocating drive, the system 300 is shown to include a return spring 318 that is attached with mounting element 317 to the base 314 and at its distal end 319 to the pedestal or platform 320. Spring 318 acts to return screen element 310 to its neutral (e.g. centered) position when it is moved from this position by motor 330 and belt 334. Hence, with return spring 318, a base 314 and rod 310 that is driven by motor 330 fed with an alternating current signal is conveniently rotated or oscillated between two edge positions. The frequency of alternating current drive to motor 330 may be chosen to be at the mechanical resonant frequency determined by the rotating moving mass of screen element 310, base 314, and motor 330 and any other moving mass, combined with the spring constant of spring 318. The resonant frequency can be adjusted by changing the tension of spring 318, such as to achieve a desired angular sweep value at a desired oscillating rate/angular velocity of the screen element 310. Such tuning typically is done in similar conditions as the planned operating environment for the system 300 to obtain a desired result (e.g., a desired amount of flicker while "hiding" the moving screen element 310). The system 300 also includes a projector 340 (such as a film or tape projector or a digital video projector) that generates or projects images (such as animated or moving images, objects, and/or characters) onto the screen element 310 or onto all or a portion of the planned sweep of the element 310.

FIG. 4A illustrates a system 400 during operation (such as or similar to system 300 of FIG. 3) to project an image or video on the screen element 310, which in motion provides a virtual or nearly invisible projector screen. As shown, the motor 330 is being operated such that its output shaft or oscillating member (not shown) drives the belt 334 back and forth as shown at 436. The belt 334, in rum, forces the pivotable base 314 to rotate quickly about its axis in an oscillating manner (e.g., between two angular positions) as shown at 430. The movement 430 of the base 314 causes the attached screen element 310 to oscillate between two edge positions, $Pos_1$ and $Pos_2$, or to quickly sweep between the positions to provide a virtual projection screen 410 as shown over the sweep angle, θ. Concurrently, the projector 340 is operated (such as discussed with reference to FIGS. 1 and 2) to project or generate a beam of projected images 420 that is directed toward the screen element 310 and the virtual screen 410 it creates with its rapid oscillations. As a result, a projected image 414 is displayed on the screen element 310 in the numerous positions of the element 310 (e.g., over the area of the screen 410). Typically, the image 414 has an area similar to that of the virtual screen 410 (e.g., to the sweep area of the screen element 310 that may be defined by the length of the element 310 and the magnitude of the sweep angle, θ, which define an area similar to a slice of pie or a generally triangular screen shape). This can be achieved by positioning and/or focusing the projector 340 to suit the length of the element 310 and its sweep angle, θ. During prototype testing, it has been seen that the image 410 appears to have some depth and to flicker in a manner that adds to the effect of a projected "hologram" with the amount of flicker decreasing with increased angular velocity of the element 310.

The oscillating rate of the motor 330 and the belt 334 it drives can be adjusted such as with controls 338 to reach a desired image 414. More generally, system 300 is "tuned" by adjusting the frequency at which the reversing polarity signals are provided to the motor 330 (e.g., the frequency of a sine wave generator-based motor controller or the like). The frequency of the signals is adjusted in some cases to try to obtain greater amounts (e.g., hear a resonance maximum) of movement of the screen element 310 for a particular energy level. Then, the sweep area, or sweep angle, θ, can be changed by adjusting or changing the amplitude of the control signals provided to the motor 330, which adjusts or controls the size of the virtual projection screen 410 (e.g., area upon which a projected image from a projector 340 is displayed).

In many cases, projected light, such as from projector 340, which does not fall onto the moving screen element can be directed so that it falls into areas not immediately viewable. For instance, in FIG. 4A, the "blow-by" light is directed upwards arid outwards past the screen element, and the blow-by light can be made to land on optically absorptive materials such as dark velvet curtains (not shown) positioned behind and/or above the element 310. In this way, the locally generated, hologram-like nature of the display is maintained, and viewers are not distracted by this secondary image light.

However, in some applications, it may be impractical to divert blow-by light. For instance, the physical environment in which a system of the invention is used may involve viewers being able to walk or stand quite close tip at least one side of the display. In such ah operating environment, blow-by light from the projector would be in their line of sight. In other applications, the viewing space around the system may have reflective materials in it that are quite close behind the screen element, which make any blow-by light visible to the observer. Further, if the projector is facing viewers (i.e., the viewers are on the opposite side of the screen element than the projector), the blow-by light could even impinge directly upon the viewers' persons and especially striking their eyes. In these cases, it may be useful to implement features that minimize or eliminate this blow-by light from a projection system.

Figure 4B:
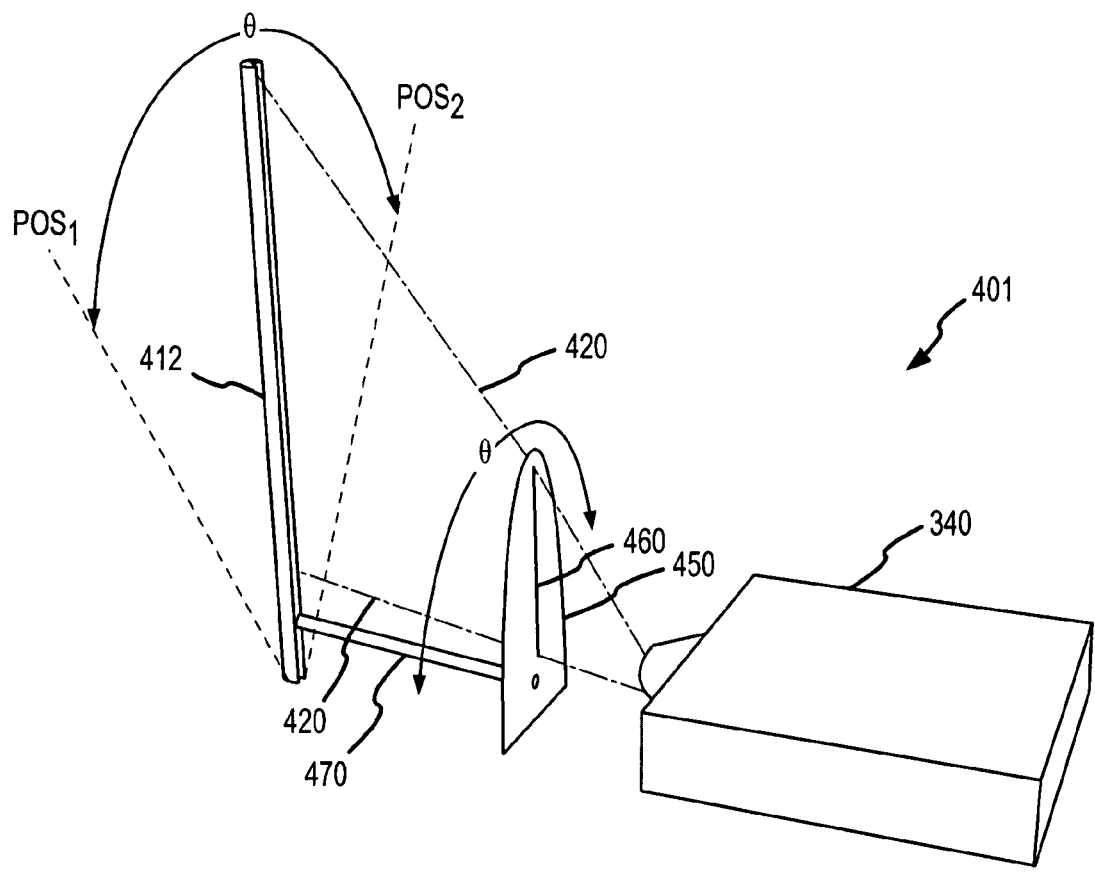
FIG. 4B illustrates a projection system similar to the one shown in FIG. 4A that is configured to suppress blow-by light from the projector.

To this end, FIG. 4B illustrates a modified version 401 of the projection system 400 of FIG. 4A used to suppress blow-by light. The projection system 401 utilizes a slit shutter 450 to cause light 420 projected from the projector 340 to be filtered or blocked such that light 420 is only or substantially only, provided at a width of the screen element 412. The shutter 450 is provided in the system 401 to rotate through about the same sweep angle, θ, and at the same speed, as moving screen segment 412. As shown, the shutter 450 is placed between projector 340 and the moving screen segment 412, with the shutter 450 typically being positioned relatively close to the projector 340 to limit the size of the shutter 450 required to block potential blow-by light and to limit its visibility to observers. The rotating shutter 450 blocks a portion of the light 420 from the projector 340 that would have been blow-by light while allowing a portion of the light rays 420 destined for the screen segment 412 to pass through optical slit 460.

The slit 460 is generally sized to allow a portion of the light 420 to pass to the element or segment 412 to light all or a portion of the face of the element 412 facing the projector 340. Hence, the light 420 striking the element 412 may have a width and/or length that is somewhat smaller than, that is about the same as, or that is somewhat larger than the width and/or length of the element 412. Rotation of the shutter 450 may be handled with a separate motor than the element 412, but more typically the shutter 450 is mechanically linked to the element 412 to rotate with the element 412. Illustratively, the rotating shutter 450 is shown mounted on the same drive shaft 470 as screen element 412, which would be rotated by the motor (such as motor 330 via drive element 334 as shown in FIG. 4A). However, other techniques and arrangements may be used to synchronize their motions, and an intermediate physical mechanism, electromechanical system, servo, or other mechanism may be used to align the movements of these two moving elements 412 and 450.

Figure 4C:
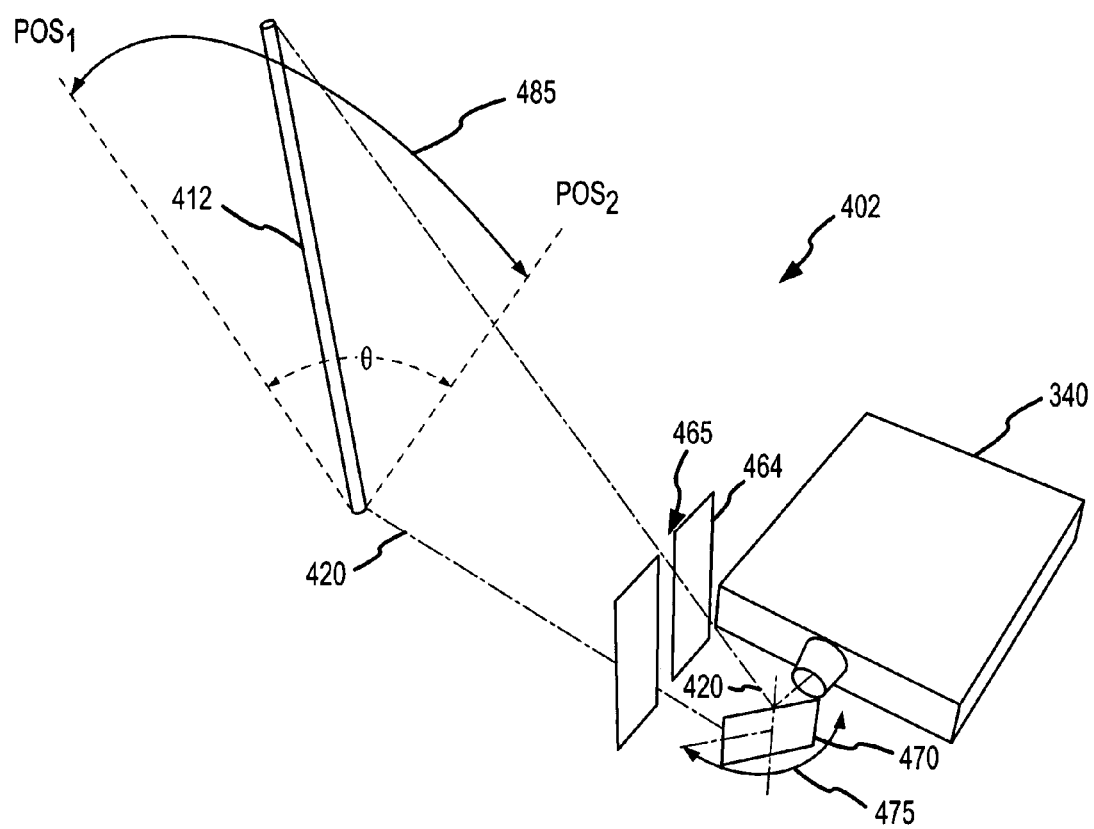
FIG. 4C illustrates another projection system according to the invention useful for controlling blow-by light and also for projecting light in or parallel to the travel plane of the oscillating rod or screen element.
Figure 4D:
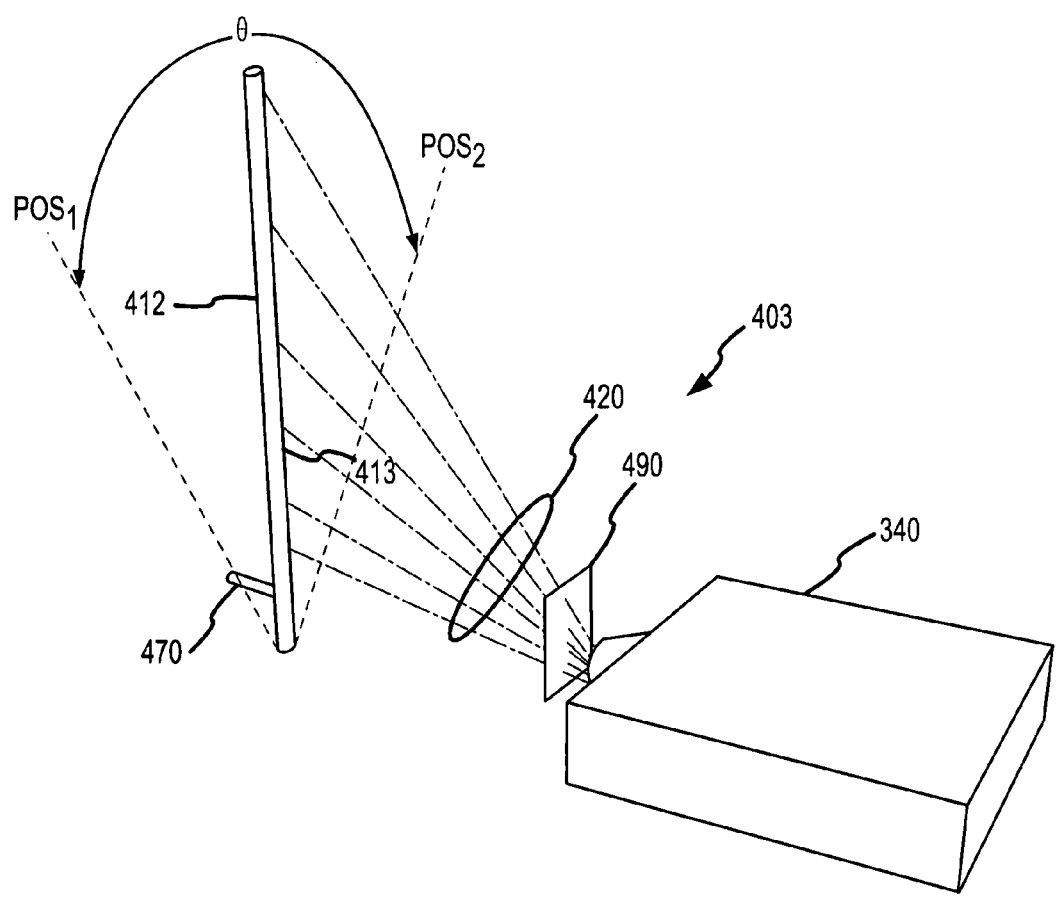
FIG. 4D illustrates a projection system similar to the system of FIG. 4A that utilizes a filter to selectively transmit light onto the screen element to control blow-by light issues.
Figure 4E:
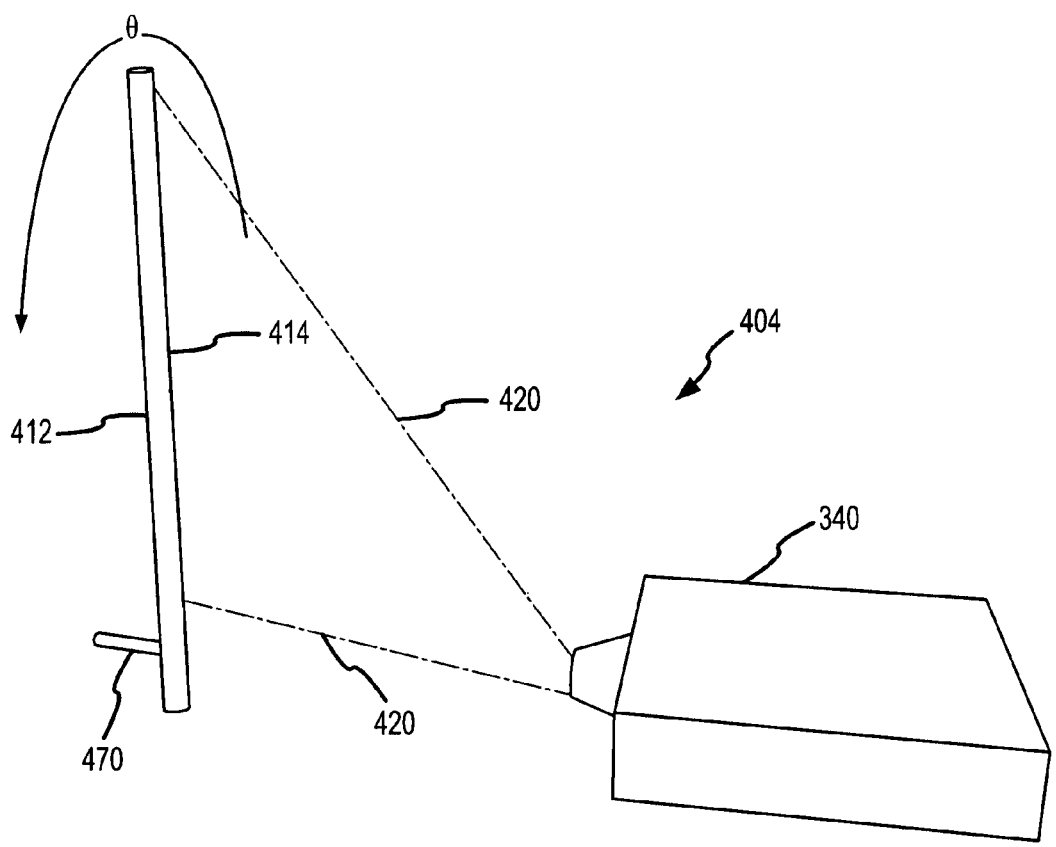
FIG. 4E illustrates a projection system similar to the system of FIG. 4A in which the screen element is coated with a material or otherwise adapted to maintain polarization of light projected onto it by a specially adapted projector.
Figure 4F:
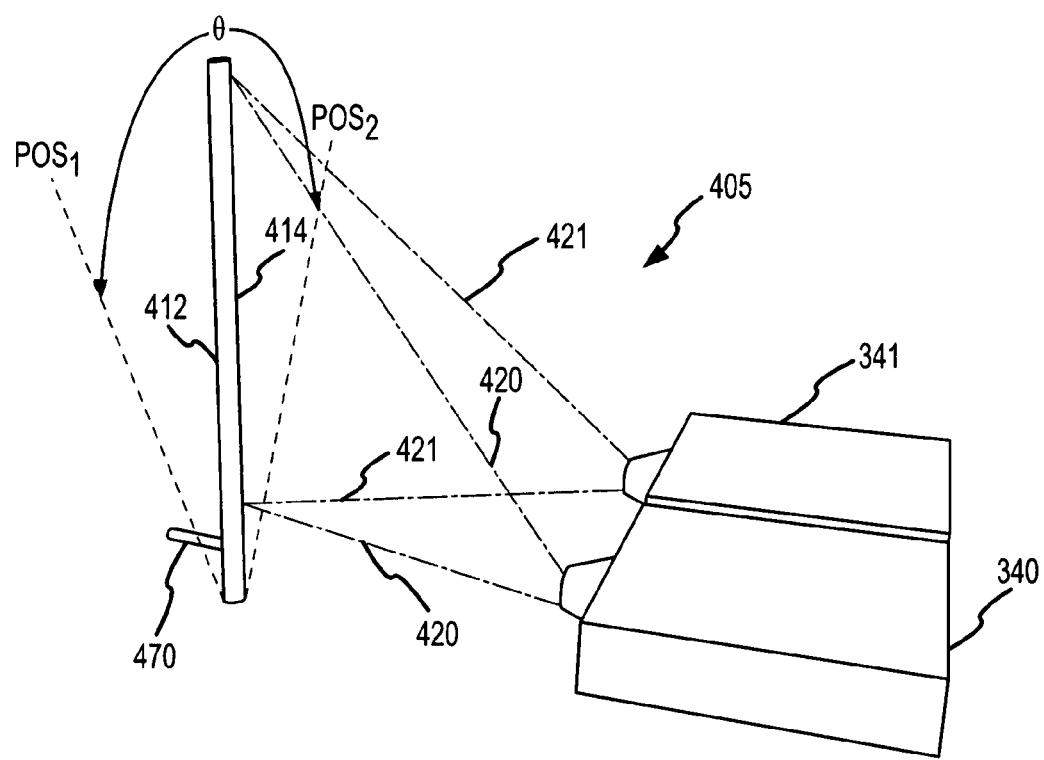
FIG. 4F illustrates a projection system providing stereo imagery.
Figure 4G:
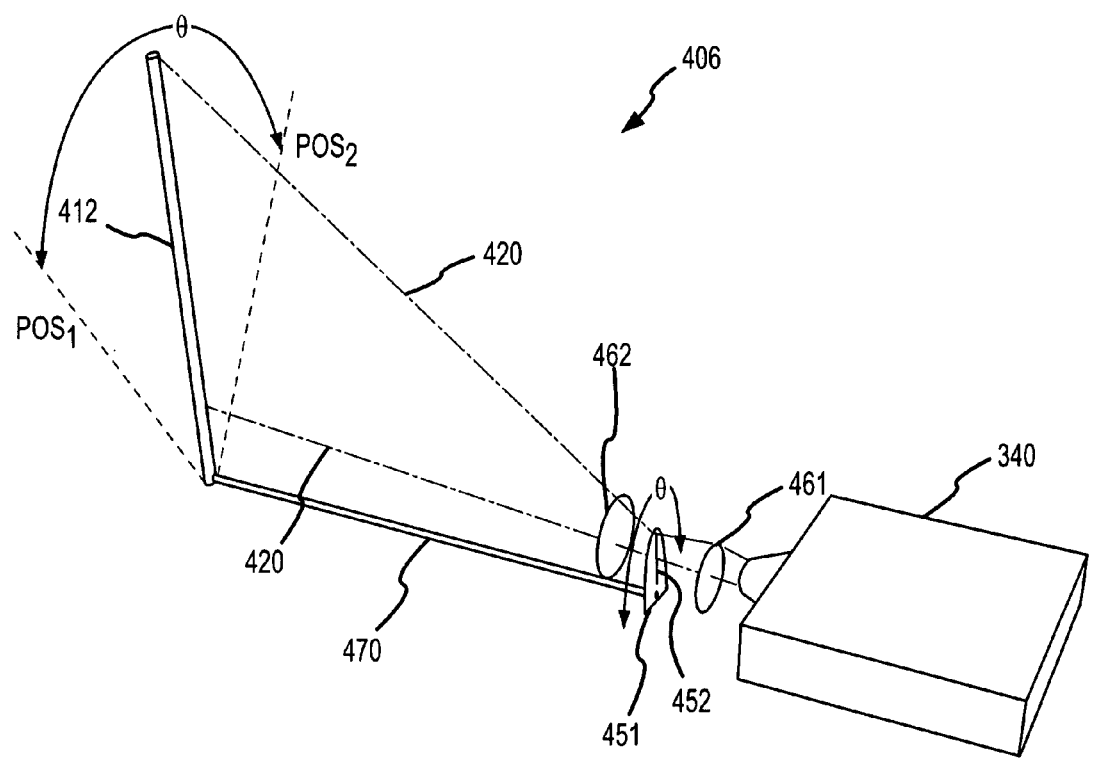
FIG. 4G illustrates an alternative embodiment of the projection system shown in FIG. 4B.

FIG. 4G illustrates an alternate embodiment 406 of the system of FIG. 4B. This embodiment 406 may be used when it is desired to match as closely as possible the projected image light to the moving screen element and thus minimize/any residual blow-by. In this case, light from projector 340 is re-imaged local to the projector by lens 461, so as to be in focus in the plane of a version 451 of slit shutter 450 (e.g., a smaller version in this example). This smaller shutter 451 passes a very accurately defined portion of the overall image through its slit 452. Light passing through slit 452 is again re-imaged and magnified for projection on virtual screen element 412 by secondary projection lens 462. In an analogous arrangement to the previous embodiment, during operation, rotary shutter 451 is moved through substantially the same angle, θ, as moving screen element 412 and is illustratively shown as being mounted on the same driveshaft 470 as screen element 412, although, as describe above, more indirect methods for synchronizing screen element 412 and shutter 451 are within the scope of our invention. It should be noted that this method of re-imaging could effectively be employed with other embodiments of the invention such as those shown in FIGS. 4C-4F.

FIG. 4C illustrates another modified version 402 of the projection system 400 of FIG. 4A used to suppress blow-by light. The projection system 402 differs in several ways from system 401. First, the system 402 utilizes a stationary shutter 464 with a slit 465 that filters the light 420 transmitted by projector 340 to block potential blow-by light. Second, the shutter 464 is positioned to project filtered light 420 onto a "side" of the element 412, i.e., direct light 420 into the travel plane of the element 412 rather than transverse to the travel plane as shown in FIGS. 1-4B. As shown in FIG. 4C, the screen element 412 is projected upon from its side, with this side-projected light being redirected forward (perpendicular or transverse to the motion of the screen element 412) to the viewer by the screen element 412. In this embodiment, it is useful to process the light 420 coming from the projector 340 such that it is generally a swathe of an image that is instantaneously appropriate for projection on the wand or element 412 relative to the position of the element 412 along its travel path 485 (or position in sweep angle, θ).

An exemplary mechanism to achieve this is shown in FIG. 4C. The system 402 accomplishes the desired selective imaging of light 420 onto the side of element 412 by scanning the light 420 coming from projector 340 horizontally across non-moving slit 465 in the filter/shutter 464 by the use of scanning mirror 470. Mirror 470 rotates horizontally about its center axis as shown at 475 through a scan or sweep angle, which typically is analogous to or the same as the angle, θ, through which screen element 412 rotates in the vertical plane. Thus, the light 420 coming through slit 465 is a vertical slit (or elongate strip) of light emitted essentially in the plane of movement of the screen element 412 and appropriate in content for instantaneous projection on the left or right side (or both with the use of a second projector 340) of screen element 412. The screen element 412 in this case may be made in a circular cross-sectional shape (see, for example, FIG. 6A), in a wedge shape (see, for example, FIG. 6C), or other useful shape selected such that light hitting the wand 412 from the side may be effectively delivered in the "forward" direction, i.e., perpendicular or at least transverse to the travel plane of the element 412. The screen element 412 may also be made of a translucent material such that projected light entering it from the side will internally scatter and leave it in all or a number of directions.

FIG. 4D illustrates another projection system 403 (e.g., a modified version of system 400 of FIG. 4A) that controls blow-by and creates other unique imagery by projecting light in wavelengths outside the visible spectrum onto the oscillating screen element. As shown, the system 403 includes components similar to that shown in FIGS. 4A and 4B except the slit shutter 450 is replaced with a transmitting filter 490 that is selected to only allow light in particular wavelength ranges to pass as shown at 420 and to strike the face or surface 413 of screen element 412. In this embodiment, the projector 340 projects spatially modulated light 420 at a wavelength that is invisible to the human eye (e.g., light in the infrared or ultraviolet regions of the electromagnetic spectrum). Screen element 412 is then coated at least on a side or face 413 proximate to the projector with a material that emits visible light when stimulated with the invisible light 420 (i.e., stimulated by light 420 of a select wavelength or within a particular range of wavelengths). For example, for use in the ultraviolet region (e.g., light 420 being provided with a wavelength in the ultraviolet region), the projected-upon portion 413 of the screen element 412 may be coated with fluorescent paint, such as manufactured by the Wildfire Company. Projector 340 may be an ordinary DILA or LCD type projector that has had an ultraviolet (or infrared) transmitting filter 490 placed over its lens. In this case, as the screen element 412 moves through the image space, it visibly glows in places corresponding to the instantaneous level of the modulating light 420. Projector 340 may also be a projector specifically designed to produce invisible light 420 in the wavelengths or ranges as disclosed to stimulate the coating or coated surface 413 of oscillating element 412.

FIG. 4E illustrates another projection system 404 (e.g., a modified version of system 400 of FIG. 4A) that controls blow-by light and creates other unique imagery by projecting light onto a surface of the oscillating screen element specially adapted to reflect the projected light. In other words, in some embodiments, it may be sufficient to allow blow-by light (e.g., a portion of projected light 420) to impinge on areas that are visible behind the moving screen segment 412 as long as this light does not form an image for the viewer. To accomplish this, screen element 412 may be covered with a material 414 or on a side 414 in the path of light 420, such as high-gain metallized screen material such as sold by the Dalite Screen company, that maintains the polarization of projected light 420 that impinges upon it. In the system 404, projector 340 may be a conventional LCD projector with its exit polarizer(s) removed (e.g., polarizer(s) on the screen side of the internal liquid crystal light modulators). In this case, the projected image 420 will be polarized spatially according to the two dimensional image applied to the projector 340, but since the human eye is not sensitive to polarization, this image 420 will appear as a uniform grey light level projected over both the screen segment 412 and any background objects (including people). In this embodiment, viewers wearing polarized glasses or otherwise looking at the display through a polarizer will be able to see an image on the moving screen element 412 via coating/surface 414.

FIG. 4F illustrates yet another projection system 405 that is adapted to provide stereo imagery using an oscillating screen 412. In one embodiment of system 405, screen element 412 is covered with polarization maintaining material 414. Two projectors 340, 341 are used, each with a polarizing filter (not shown) mounted at right angles to each other and with polarizations matching those of users' or viewers' polarized glasses. In this manner, a stereoscopic image may be produced with polarized images 420, 421 from projectors 340, 341. This stereoscopic image provided on coated surface 414 of element 412 over sweep angle, θ, is one which is particularly compelling since the screen itself, which can be an inconsistent depth cue in conventional stereo projection systems, is particularly hard to see.

Figure 5:
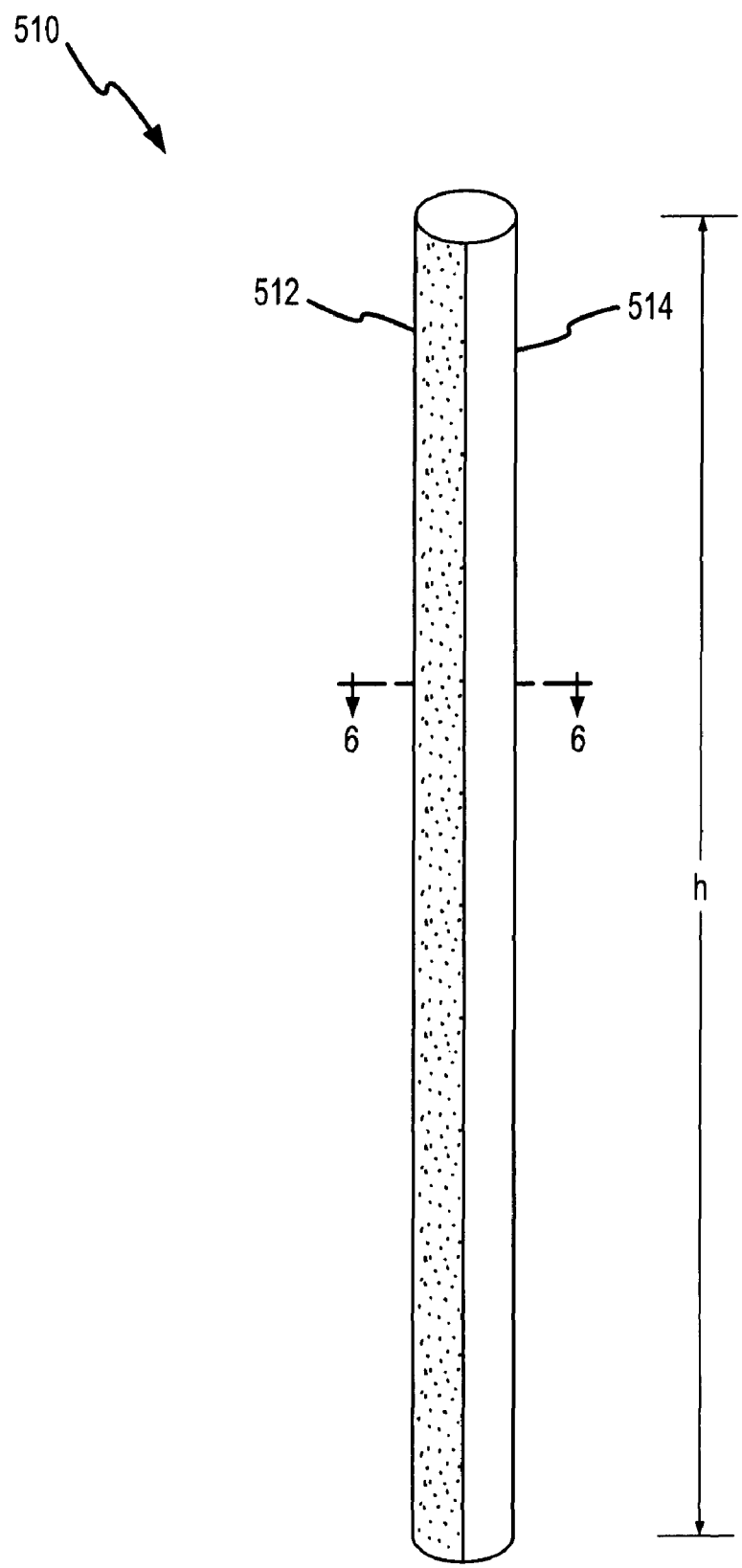
FIG. 5 shows a perspective view of one useful embodiment of a screen element of the invention such as may be used in the systems shown in FIGS. 1-4F.

FIG. 5 illustrates in more detail a screen element 510 that may be used in the projection systems of the invention such as systems 100, 200, and 300 of FIGS. 1-4. The element 510 is a rod with a length or height, h and a diameter. The rod diameter is generally kept relatively small such as less than about 1 inch and more typically less than about 0.5 inches (such as 0.125 to 0.375 inches in diameter); as these small diameter rods 510 are easier to oscillate or "whip" at higher angular velocities, still provide adequate screen area for displaying an image, and are more difficult to see (e.g., are easier to hide from a viewer to maintain the virtual projector screen effect). However, the invention may be practiced with much larger diameter screen elements with diameters well over 1 inch as long as the motor and base are powerful and strong enough to handle the size and weight of the element 510. The length or height, h, of the element 510 may also vary widely (such as a few inches to a few feet or more) with the height, h, often varying with the diameter of the element 510 (e.g., the larger the diameter or thickness of the element 510 the greater the height or length, h). In one example, the rod or element 510 is a 0.25 diameter rod that is selected from the height range of about 2 to 6 feet and more typically is about 2.5 to 3.5 feet in length or height, h. As discussed earlier, many materials may be used for the screen element 510 with plastics, metals, and fiber compositions such as carbon, graphite, and the like being useful materials. In one implementation, the rod 510 is carbon fiber.

The rod 510 has "sides" or segments or faces that are used to display images. For example, the rod or element 510 may be thought of as having four sides or segments (e.g., each segment is about one fourth the circumference of the rod or element 510 or the non-display portions may be smaller fractions of the circumference in some embodiments). The segment or face 514 that is used to display an image or upon which a projected image is shown is preferably a lighter color than that of adjacent segments or faces that are to remain "hidden" from view. For example, the display face or side 514 of the element 510 may be white while the adjacent or hidden side 512 may be black in color. The coloring of the sides or faces 512, 514 may be provided by the material itself (e.g., a white plastic or black carbon or graphite rod) or may be provided by applying paint or other coloring (e.g., paint portions of a white rod black of vice versa).

The cross sectional shape of the screen element may be varied significantly to practice the invention. The element is preferably provided with at least one display face or surface for providing a surface area upon which a projected image can be displayed as the screen element oscillates; and also preferably the shape is selected to provide adequate strength characteristics during operations of a projector system (e.g., to resist fracture or other failure). The cross section may be solid (e.g., as shown in FIGS. 6A-6D), be a hollow-walled shape, and/or be a combination (e.g., hollow-walled shape with additional supports such as spokes stretching across the internal diameter). The element 510 is shown in FIG. 6A as being a solid, circular rod with a diameter and sides or faces 512, 514. As an alternative, FIG. 6B shows a screen element, rod, beam, stick, whip, or the like 610 that has a square cross sectional shape. The element 610 is defined by a display or first side/face 614 and a hidden or second side/face 612 that each have a width, w (e.g., 0 to 1 inch or more). FIG. 6C shows a screen element 620 with a triangular cross section defined by a display side 624 (e.g., a white or other lighter color side for displaying projected images) and a pair of hidden or second sides 622 (e.g., black or other darker colors). In cases where second or third projectors are used (e.g., see the system 200 of FIG. 2), one of both of the sides 622 may be used as second and/or third display surfaces. FIG. 6D shows a screen element 630 with a rectangular cross section in which a display side or face 634 has a length, l, that is larger than a width, w, of a hidden or non-display side 632. This provides a larger relative surface area for displaying a projected image while also making it more difficult to see the hidden or non-display side 632. With these exemplary cross sectional shapes in mind, many other useful cross sectional shapes will become apparent to those skilled in the art and are considered within the breadth of this description. Such additional shapes may be regular similar to the ones shown or be irregular and may include many other polygons with planar surfaces acting as display surfaces or curved shapes such as elliptical cross sections that provide large display surfaces relative to their hidden ends/side surfaces. The shapes may also be chosen to provide low aerodynamic drag to both decrease the amount of power required to move them and to lower residual noise caused by air drag.

Figure 7:
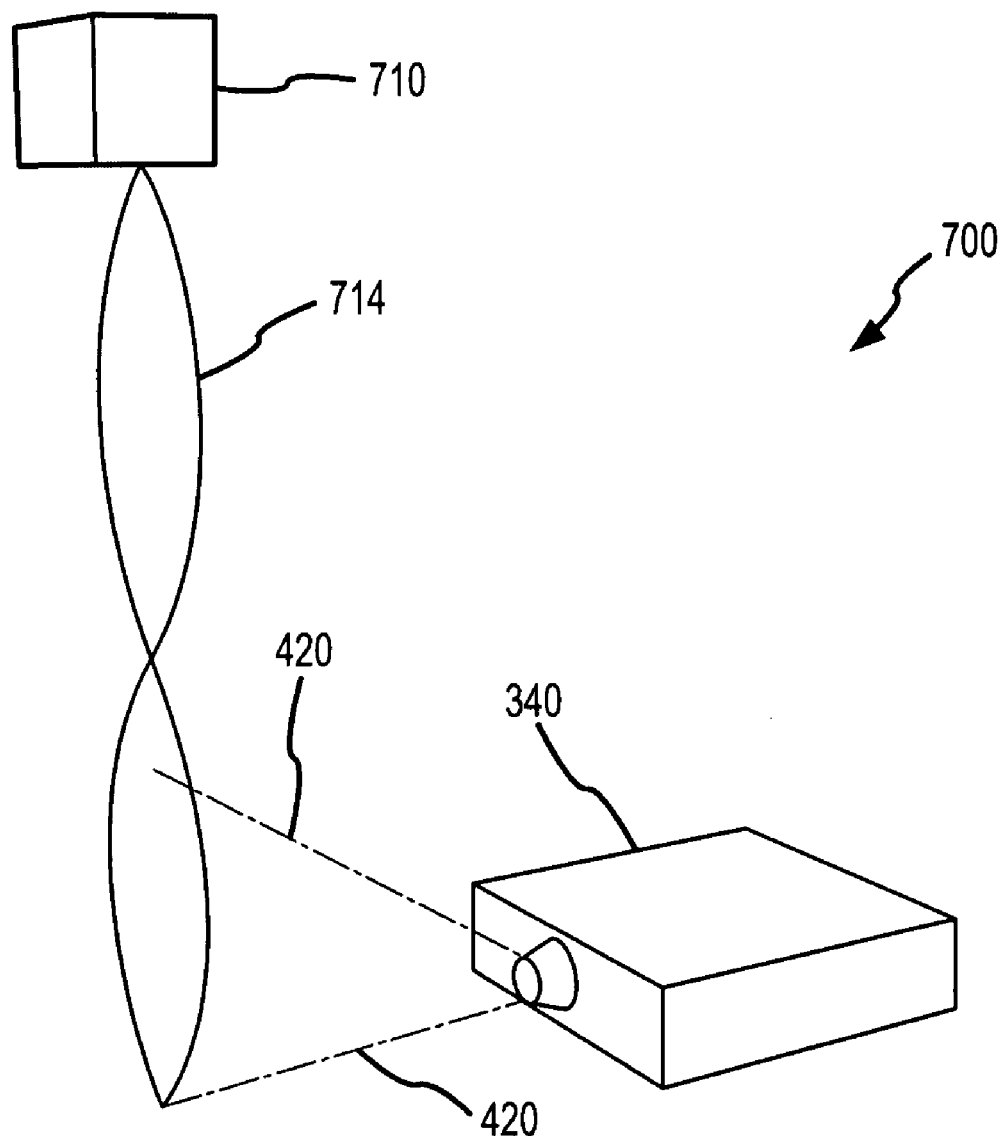
FIG. 7 illustrates a projection system according to another embodiment in which a flexible screen element is suspended below an oscillating drive mechanism to produce a virtual projector screen with one, two, or more screen portions.

The above described projection systems generally provide moving screen elements that are rigid with the every portion of the element moving through the same angle during operation. In other cases, though, it may be desirable to replace the rigid screen elements with a flexible screen element to achieve a virtual projector screen. FIG. 7 depicts ah illustrative embodiment of a projection system 700 (such as a modified version of system 400 or another one of the projection systems described herein). In the system 700, a screen element 714 is provided that is adapted to be flexible enough so that it may be hung inverted from mounting base 710. The mounting base 710 contains a moving fulcrum (not shown) as previously described in with reference to FIGS. 1-4F disclosure. Illustratively, screen element 714 is actuated back and forth such that it fully flexes and two movement maxima occur, e.g., at the second harmonic of the flexible sheet's "string" resonance. Each of these "eyes" may be used as projection surfaces for a projector or projectors 340, e.g., to provide a two-part screen for a single image or for a two-part image or images. In this manner, the system 700 provides a screen 714 that can be easily deployed in a hanging configuration. It should be noted that if screen element 714 is rigid enough, it may be mounted vertically and supported from its bottom while still being flexible to provide the two or more part virtual screen caused by oscillation. It should also be further noted that 1, 2, 3 or more open "eyes" or virtual projector screens can be produced in the system 700 depending on the novel screen arrangements desired. Of course, systems of FIGS. 1-4F may be modified to have the screen elements extending from a more horizontal position (rather than vertical as shown) or to extend more downward as shown in FIG. 7 (or even at any number of oblique angles rather than generally in a plane perpendicular to the earth).

In addition to screens that are comprised of flexible elements, parts of the screen may be more rigid than others (e.g. screens where a portion of the screen is rigid, and other portions more like string or cord), or screens where the thickness, and therefore the rigidity of the screen element is otherwise non-uniform over its length all are within the scope of our invention. This may be achieved with two part screen elements or elements made of more than one material or the like. Further, the systems shown typically only utilized a single screen element, but the concepts described herein may readily be extended to projection, systems including two or more oscillating screen elements or one or more oscillating screen elements combined with one or more stationary screen elements. For instance, two or more oscillating screen elements may be employed with the elements oscillating in planes that are at varying distance from a projector and even in planes that are not strictly perpendicular to the projector. In this manner, it is possible to achieve different planes, or layers, of depth projection. Owing to the virtual nature of the projection elements, it is possible to provide these multi-plane displays with background objects being visible "through" foreground planes thus increasing the sense of three-dimensional imagery. The whip's movements, in this case, may be synchronized with the frames of image presentation of the projector such that crosstalk between the images on the various planes may be avoided or at least better controlled.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. An apparatus for displaying projected images, comprising:
   a projector projecting images; and
   a virtual projector screen assembly comprising an elongate screen element mounted to a base configured for pivoting about its axis and a driver pivoting the base, wherein the screen element oscillates between two edge positions and during the oscillation the projected images are displayed on a side of the screen element proximate to the projector.

2. The apparatus of claim 1, wherein the two edge positions intersect at the base to define a sweep angle that is less than about 90 degrees.

3. The apparatus of claim 2, wherein the driver of the virtual projector screen assembly comprises a motor with an oscillating output member pivoting the base and wherein the rate of oscillation of the output member is adjustable with a control signal, whereby the oscillation of the screen element is adjustable.

4. The apparatus of claim 3, wherein the control signal for the motor defines a value of the sweep angle, whereby a size of a virtual projector screen provided by the screen element is set by altering the sweep angle.

5. The apparatus of claim 1, wherein the screen element is a rod with a diameter of less than about 1 inch and a length of less than about 6 feet.

6. The apparatus of claim 1, wherein the display side of the screen element is white and an adjacent portion is black.

7. The apparatus of claim 1, further comprising an additional projector projecting additional images onto a side of the screen element opposite the display side.

8. The apparatus of claim 7, wherein the additional images comprise another view of the projected images displayed on the display side of the screen element.

9. A virtual projector screen system for displaying images projected from a projector, comprising:
   a rod with a side facing, the projector to display the projected images, the display side extending between first and second ends of the rod; and
   a base with an oscillating: portion, wherein the first end of the rod is rigidly attached to the oscillating portion such that the second end of the rod moves between two outer edge positions defining a sweep angle there between.

10. The system of claim 9, further comprising a motor with an output shaft oscillating between two angular positions and a drive element connecting the output shaft to the oscillating portion of the base.

11. The system of claim 10, wherein the oscillating portion of the base comprises a structural member pivotable about a central axis parallel to the output shaft and the drive element comprises a belt.

12. The system of claim 9, wherein the rod has a length less than about 6 feet and an outer diameter of less than about 0.5 inches.

13. A system for displaying video images on a virtual or hidden projector screen, comprising:
   a video projector projecting a stream of video images;
   an elongate screen element positioned in the stream of video images; and
   means mechanically linked to the screen element for oscillating of the screen element between two edge positions.

14. The system of claim 13, the driving means comprising a base to which one end of the screen element is rigidly mounted, wherein the base pivots about a central axis between two angular positions, and a motor driven by a control signal to alter output direction of an output shaft linked to the base at a frequency that defines the oscillating of the base between the two angular positions, whereby the attached screen element is driven to oscillate between the two edge positions.

15. The system of claim 14, wherein the motor is controlled by a sine wave generator and the sine wave generator is adjustable to provide the control signal to select me frequency, whereby the oscillating of the base and attached screen element is adjustable.

16. The system of claim 14, the driving means further comprising a spring attached to the base resonating the pivoting of the base about its axis.

17. The system of claim 13, wherein the screen element comprises a rod with a diameter of less than about 0.5 inches and a length of less than about 6 feet, the rod comprising a white display face proximate to the projector to display the video images.

18. The system of claim 17, wherein screen element is suspended from the oscillating means and is flexible, whereby the screen element is oscillated to form two or more virtual screens to receive the stream of video images.

19. The system of claim 13, further comprising a management system selectively providing control signals to the projector and the oscillating means to concurrently operate the projector and the oscillating means.

20. The system of claim 19, wherein the control signals transmitted to the oscillating means define a sweep angle between the two edge positions.

21. The system of claim 13, further comprising an additional video projector projecting an additional stream of video images, wherein the additional stream contacts a different portion of the screen element than the stream of the video images from the video projector.

22. The system of claim 13, wherein the stream of video images comprises light with a polarization and wherein the screen element comprises a coating, selected to maintain the polarization of the light.

23. The system of claim 13, wherein the stream of video images comprises light having a wavelength outside the visible spectrum and wherein the screen element comprises a surface comprising material that emits light in the visible spectrum when stimulated by the light of the stream of video images.

24. The system of claim 13, further comprising a shutter positioned between the video projector and the screen element to block at least a portion of the stream of video images and to pass a portion of the stream of video images through a slit, whereby blow-by light is lessened in the system, wherein the shutter is linked to the oscillating means to oscillate with the screen element.

25. The system of claim 13, further comprising a shutter positioned between the projector and the screen element and including an elongate slit for filtering the stream of video images and further comprising a reflective element positioned between the projector and the shutter, wherein the reflective element oscillates about an axis through an angle substantially equivalent to the sweep angle.

26. The system of claim 25, wherein the filtered stream of video images is transmitted toward the screen element substantially in a plane containing the two edge positions of the screen element to strike a side of the screen element.

27. The system of claim 25, wherein the screen element and the reflective element are oscillated at substantially equivalent oscillation rates.

28. The system of claim 13, further comprising an additional video projector projecting an additional stream of video images toward the screen element wherein the stream of video images and the additional Stream of video images comprises light with polarized at substantially right angles and wherein the screen element comprises a polarization maintaining material.

29. The system of claim 9, wherein the sweep angle is less than about 90 degrees.

* * * * *

UNITED STATES PATENT AND TRADEMARK OFFICE
CERTIFICATE OF CORRECTION

PATENT NO.            : 7,740,359 B2                                                Page 1 of 1
APPLICATION NO. : 11/837990
DATED                    : June 22, 2010
INVENTOR(S)         : Schnuckle et al.

It is certified that error appears in the above-identified patent and that said Letters Patent is hereby corrected as shown below:

Column 1, line 42, delete "hot" and insert therefor --not--.
    Column 1, line 46, delete "Or" and insert therefor --or--.
    Column 4, line 23, delete "oh" and insert therefor --on--.
    Column 16, line 14, after "facing", delete --,--.
    Column 16, line 17, after "oscillating", delete --:--.
    Column 16, line 51, delete "me" and insert therefor --the--.

Signed and Sealed this

Third Day of August, 2010

David J. Kappos
*Director of the United States Patent and Trademark Office*